(12) United States Patent
Ishii

(10) Patent No.: US 8,854,667 B2
(45) Date of Patent: Oct. 7, 2014

(54) ENABLING STATUS INFORMATION OF AN IMAGE FORMING APPARATUS TO BE NOTIFIED TO A COMPUTER TO WHICH THE CONNECTION FROM THE IMAGE FORMING APPARATUS HAS FAILED

(75) Inventor: Masaru Ishii, Hachioji (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 184 days.

(21) Appl. No.: 13/472,689

(22) Filed: May 16, 2012

(65) Prior Publication Data
US 2012/0293825 A1 Nov. 22, 2012

(30) Foreign Application Priority Data

May 20, 2011 (JP) .................................. 2011-113778

(51) Int. Cl.
*G06F 3/12* (2006.01)
(52) U.S. Cl.
CPC ............ *G06F 3/1207* (2013.01); *G06F 3/1229* (2013.01); *G06F 3/1288* (2013.01); *G06F 3/1259* (2013.01); *G06F 3/1238* (2013.01)
USPC ...................................................... 358/1.15

(58) Field of Classification Search
USPC ...................................................... 358/1.15
See application file for complete search history.

(56) References Cited

U.S. PATENT DOCUMENTS

2003/0172308 A1 9/2003 Imani
2005/0094185 A1* 5/2005 Hayakawa .................... 358/1.14

FOREIGN PATENT DOCUMENTS

| JP | 08-221234 A | | 8/1996 |
|---|---|---|---|
| JP | 2001-202223 A | | 7/2001 |
| JP | 2004-005418 A | | 1/2004 |
| JP | 2004-220211 | * | 8/2004 |
| JP | 2004-287855 A | | 10/2004 |

OTHER PUBLICATIONS

Office Action (Notification of Reason for Refusal) issued on Aug. 6, 2013, by the Japanese Patent Office in corresponding Japanese Patent Application No. 2011-113778 and English translation thereof. (5 pages).

* cited by examiner

*Primary Examiner* — Eric A Rust
(74) *Attorney, Agent, or Firm* — Buchanan Ingersoll & Rooney PC

(57) ABSTRACT

An image forming apparatus connected to a first network has a log notification part that transmits a communication failure log in response to a connection from a computer connected to a second network. The communication failure log contains status information planned to be transmitted by an image forming apparatus that is connected to the first network, to a computer to which the image forming apparatus failed in a connection, or location designation data for designating a location in the first network where the status information is stored. The computer has a log receiving part for receiving the communication failure log transmitted from the image forming apparatus, and a status information notification part for transmitting the status information or the location designation data contained in the received communication failure log to other computers connected to the second network.

23 Claims, 8 Drawing Sheets

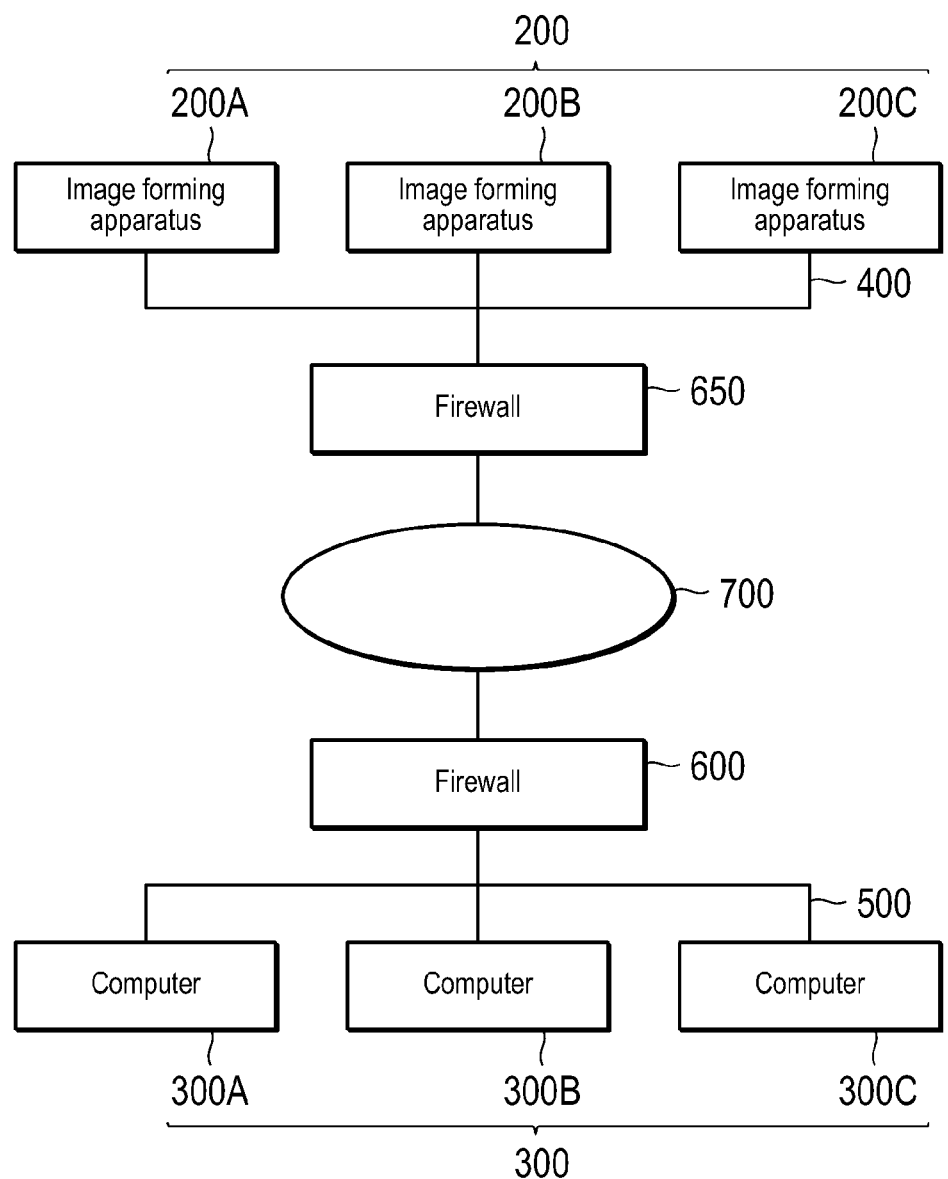

ENABLING STATUS INFORMATION OF AN IMAGE FORMING APPARATUS TO BE NOTIFIED TO A COMPUTER TO WHICH THE CONNECTION FROM THE IMAGE FORMING APPARATUS HAS FAILED

CROSS-REFERENCE TO RELATED APPLICATION

This application is based on Japanese Patent Application No. 2011-113778 filed on May 20, 2011, the contents of which are incorporated herein by reference.

BACKGROUND

1. Technical Field

The present invention relates to an image forming system, an image forming apparatus, a computer, and a computer readable recording medium stored with a control program.

2. Description of Related Art

An image forming apparatus is typically controlled by grasping the operating status of the image forming apparatus by means of acquiring the status information (error notifications and job completion notifications) as it is informed by the image forming apparatus via a network (e.g., Unexamined Japanese Patent Publication No. H08-221234).

However, while it is now normal to have an access control device (e.g., firewall) in a network for the sake of security enhancement, it creates problems such that, under a security environment where a connection to an image forming apparatus from a computer forming apparatus is normally accepted but a connection to a computer from an image forming apparatus is denied, a job transmission from a computer is done without problems but a transmission of status information from an image forming apparatus fails, thus making it difficult to control the image forming apparatus and may delay a necessary response in such a case as an error occurred. On the other hand, although it is possible to modify the configuration of the access control device to allow the connection from the image forming apparatus, it is difficult to maintain a secure environment.

SUMMARY

The present invention is made in order to solve the abovementioned problem associated with the related art, and to provide an image forming system, an image forming apparatus, a computer, and a computer readable recording medium stored with a control program that enable the status information of the image forming apparatus to be notified to the computer to which the connection from the image forming apparatus failed.

To achieve at least one of the abovementioned objects, an image forming system reflecting one aspect of the present invention comprises a plurality of image forming apparatuses connected to a first network, and a plurality of computers which are connected to a second network and transmit jobs to the image forming apparatuses. The image forming apparatus has a log notification part that transmits a communication failure log in response to a connection from the computer connected to the second network. The communication failure log contains status information planned to be transmitted by an image forming apparatus that is connected to the first network, to a computer to which the image forming apparatus failed in a connection, or location designation data for designating a location in the first network where the status information is stored. The computer has a log receiving part for receiving the communication failure log transmitted from the image forming apparatus, and a status information notification part for transmitting the status information or the location designation data contained in the received communication failure log to other computers connected to the second network.

To achieve at least one of the abovementioned objects, an image forming apparatus reflecting another aspect of the present invention is applied to an image forming system with a plurality of image forming apparatuses connected to a first network and a plurality of computers which are connected to a second network and transmit jobs to the image forming apparatuses and comprises a log notification part that transmits a communication failure log in response to a connection from the computer connected to the second network. The communication failure log contains status information planned to be transmitted by an image forming apparatus that is connected to the first network, to a computer to which the image forming apparatus failed in a connection, or location designation data for designating a location in the first network where the status information is stored.

To achieve at least one of the abovementioned objects, a computer readable recording medium reflecting another aspect of the present invention stores a control program for controlling an image forming apparatus applied to an image forming system with a plurality of image forming apparatuses connected to a first network and a plurality of computers which are connected to a second network and transmit jobs to the image forming apparatuses, wherein the control program causes the image forming apparatus to execute a process comprising a log notification procedure of transmitting a communication failure log by means of a log notification part of the image forming apparatus in response to a connection from the computer connected to the second network. The communication failure log contains status information planned to be transmitted by an image forming apparatus that is connected to the first network, to a computer to which the image forming apparatus failed in a connection, or location designation data for designating a location in the first network where the status information is stored.

To achieve at least one of the abovementioned objects, a computer reflecting another aspect of the present invention is applied to an image forming system with a plurality of image forming apparatuses connected to a first network and a plurality of computers which are connected to a second network and transmit jobs to the image forming apparatuses and comprises a log receiving part; and a status information notification part. The log receiving part receives a communication failure log transmitted from the image forming apparatus when the image forming apparatus connected to the first network responds to a connection requested. The communication failure log containing status information planned to be transmitted by an image forming apparatus that is connected to the first network, to a computer to which the image forming apparatus failed in a connection, or location designation data for designating a location in the first network where the status information is stored. The status information notification part transmits the status information or the location designation data contained in the received communication failure log to other computers connected to the second network.

The objects, features, and characteristics of this invention other than those set forth above will become apparent from the description given herein below with reference to preferred embodiments illustrated in the accompanying drawings.

BRIEF DESCRIPTION OF THE DRAWINGS

FIG. 9 is a conceptual diagram for describing a modification 2 according to the embodiment of the present invention.

DETAILED DESCRIPTION

The embodiments of the present invention will be described in detail below with reference to the accompanying drawings.

Figure 1:
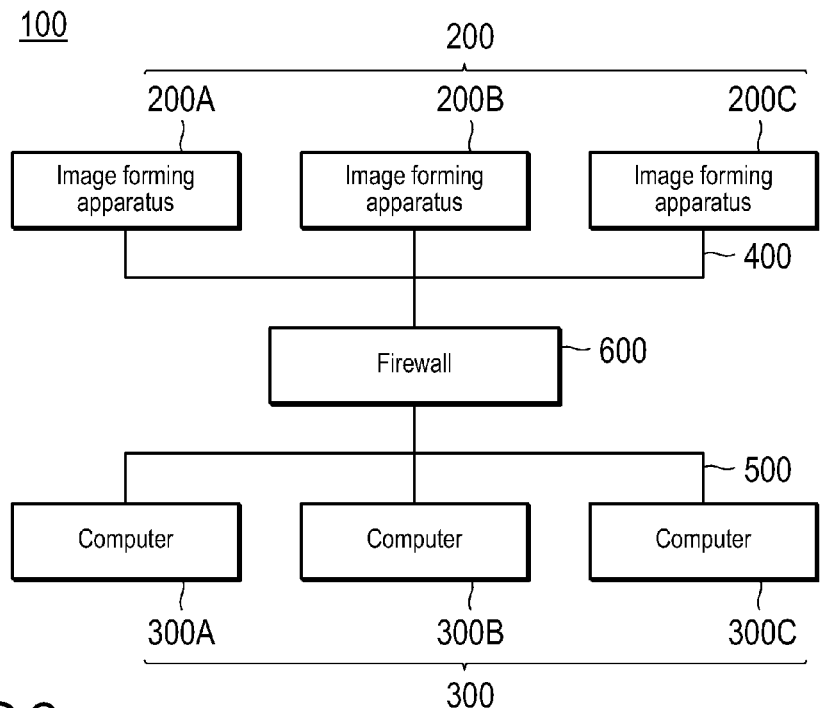
FIG. 1 is a conceptual diagram for describing an image forming system according to an embodiment of the present invention.

FIG. 1 is a conceptual diagram for describing an image forming system according to an embodiment of the present invention.

An image forming system 100 according to the embodiment of the present invention includes a plurality of image forming apparatuses 200 (200A-200C), a plurality of computers 300 (300A-300C), local networks 400 and 500, and a firewall 600.

The image forming apparatus 200 is used for printing image data generated from print data contained in a received print job, and has a log notification function. The log notification function is a function for transmitting a communication failure log in case of responding to a connection from the computer 300.

The communication failure log is, for example, described in XML (Extensible Markup Language) and contains identification data and status information. The identification data is used to identify the computer 300 which the image forming apparatus 200 failed in a connection, and can be configured with an IP address (Internet Protocol Address), MAC address (Media Access control address), etc.

The status information is information that image forming apparatus 200 intended to transmit to the computer 300 which it failed in a connection, and contains identification data of the print job, identification data of the image forming apparatus 200, information about an error generated during printing, job completion information, etc. The error information includes mechanical failures, shortage of consumable items (e.g., paper and toner), etc.

The computer apparatus 300 which is a client terminal device used for generating a print job that contains print data and transmitting it to the image forming apparatus 200, has a status information notification function and includes an administrator's computer, etc. The status information notification function is a function for transmitting, upon receiving a communication failure log from the image forming apparatus 200, the status information contained in the received communication failure log to other computers 300.

The local network 400 is a first network the image forming apparatus 200 is connected with, to which the access control is applied so that unconditional communications (connection without restriction) can be maintained between equipment within the network. The local network 500 is a second network the computer 300 is connected with, wherein the access control is applied in such a manner as to allow unconditional communications (connection without restriction) between equipment within the network. The local networks 400 and 500 consist of LAN (Local Area Network) that connects computers and network equipment based on standards such as Ethernet (registered trademark), Token-Ring, FDDI (Fiber-Distributed Data Interface), and the like. The protocol of the local networks 400 and 500 is, for example, TCP/IP (Transmission Control Protocol/Internet Protocol).

The firewall 600 is an access control device for providing the security (for maintaining a secure environment) of the local networks 400 and 500 by allowing or denying communications between the local network 400 (image forming apparatus 200) and the local network 500 (computer 300). The fire-wall 600 is, for example, a static packet filter type, which is configured to monitor the IP addresses and port numbers of destinations and sources in order to allow a connection to the image forming apparatus 200 from the computer 300, but deny a connection to the computer 300 from the image forming apparatus 200.

In the image forming system 100, a communication failure log is transmitted at the instance when the image forming apparatus 200 responds to a connection made by the computer 300, which is connected to it via the local network 500, so that the particular communication is allowed without any need of modifying the configuration of the firewall 600 or building a special environment.

Moreover, since the computer 300 that received the communication failure log transmits the status information to other computers 300 connected to the local network 500, the status information can be securely transmitted to the computer 300 which failed the connection. In other words, even if the fire wall 600 stands between the two networks (regardless of the aforementioned configuration of the firewall 600), the status information of the image forming apparatus 200 which failed the connection can be transmitted to the computer 300.

The communication failure log can also contain the location designation data for identifying the location within the local area network 400 where the status information is stored in lieu of the status information. The location designation data includes the identification data of the image forming apparatus 200 that failed in the connection, the URL (Uniform Resource Locator) data that indicates the file name used in the storage device thereof, etc. In this case, the computer apparatus 300 that received the location designation data is required to make a connection separately based on the location designation data in order to obtain the status information.

The firewall 600 is not limited by any particular packet filter type and can be configured with dedicated hardware of its own, or with a general-purpose computer in which firewall software is installed. It is also possible to provide the firewall 600 in each computer 300 or install it as application software. The types and quantities of the devices (image forming apparatuses, computers and firewalls) connected to the networks 400 and 500 are not limited to those shown in FIG. 1.

The image forming apparatus 200 is described below.

Figure 2:
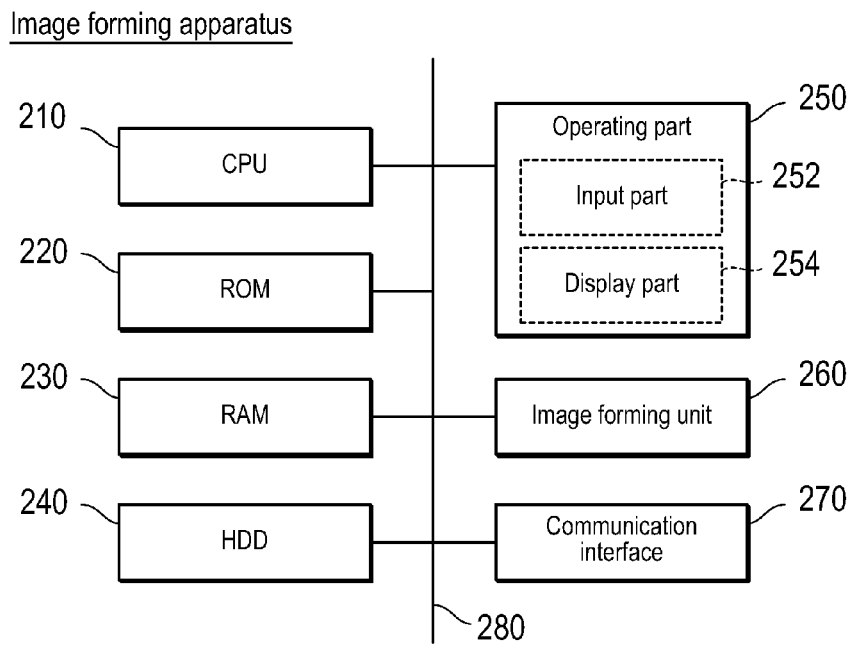
FIG. 2 is a block diagram for describing the image forming apparatus shown in FIG. 1.

FIG. 2 is a block diagram for describing the image forming apparatus shown in FIG. 1.

The image forming apparatus 200 is equipped with a CPU 210, a ROM 220, a RAM 230, an HDD 240, an operating part 250, an image forming unit 260, and a communication interface 270, all of which are interconnected via a bus 280.

The CPU 210 is a control circuit composed of microprocessors and the likes that control the aforementioned various parts and execute various arithmetic processes according to programs, and various functions of the image forming apparatus 200 are realized as the CPU 210 executes the corresponding programs.

The ROM 220 is a non-volatile semiconductor memory for storing various processing programs and data. The RAM 230 is a volatile semiconductor memory for temporarily storing programs and data as a working area. The HDD 240 is a magnetic disk device of a large capacity for storing various control programs, various processing programs, and various data. The stored program is read out as it becomes necessary by the CPU 210 and is executed on the RAM 230.

The stored control programs have a log notification module, a log sharing module, an image forming apparatus search module, a table registration module, etc. The log notification module is used for transmitting a communication failure log in case of responding to a connection from the computer 300.

The log sharing module is used for transmitting the communication failure log, which contains the status information planned to be transmitted, to other image forming apparatuses 200 if the connection to the computer 300 for the purpose of transmitting the status information is failed (e.g., denied by the firewall 600). The log sharing module is configured in such a manner as to transmit the communication failure log to the image forming apparatus 200 that requires it based on the identification data table where the identification data of the image forming apparatus 200, which is connected to the local network 400, is registered in advance.

The identification data table is generated by an image forming apparatus search module and a table registration module, where the image forming apparatus search module is used for searching the image forming apparatus 200 that requires the transmission of the communication failure log, while the table registration module is used for registering the identification data of the searched image forming apparatus 200 to the identification data table.

The stored processing program contains a RIP (raster image processing) program, etc. The RIP is a processing for converting the image data generated based on the print job received from the computer 300 into raster image data to be used in the image forming unit 260.

The stored data consists of print jobs received, image data generated from the print jobs, own communication failure log, communication failure logs acquired from other image forming apparatuses 200, then identification data table where the identification data of the image forming apparatuses 200 that are connected to the local network 400 is stored, etc.

It is possible to store a portion of the programs and data stored in the HDD 240 into the ROM 220 and store a portion of the programs and data stored in the ROM 220 on the HDD 240 as needed. It is also possible to use a semiconductor memory of a large capacity instead of HDD 240, or do without HDD 240 as desired.

The operating part 250 has an input part 252 and the display part 254. The input part 252 is used by the user for executing text input, various settings, and various instructions (input) such as start instruction, and consists of, for example, a keyboard with a plurality of keys including ten keys for setting the number of copies to be made, a start key for instructing the start of an operation, a stop key for instructing the stop of an operation. The input (or modified) setup contents are stored in the RAM 230, and their processes are executed by the CPU 210 as needed. The display part 254 is an output device for showing the printing setup and the main unit setup to be checked by the user, and is configured by an LCD (Liquid Crystal Display), or a touch panel, for example.

The image forming unit 260 has an engine for forming an image on a sheet of paper as the recording medium, using an image forming process such as an electronic photographing process containing electrostatic charging, exposure, development, transfer, and fixing steps, and is used for printing the image data stored in the HDD 240 according to the instructions of the CPU 210. The printing (image forming) process is not limited to the embodiment of using the electronic photography process but rather the impact type, the thermal transfer type, and the ink jet type can also be applied arbitrarily.

The communication interface 270 is a communication part composed of an extended device (LAN board) that adds the communication function to the image forming apparatus 200 via the local network 400, and is used for executing the two-way transmission of data with other image forming apparatuses 200 that belong to the local network 400 and for executing the two-way transmission of data with the computer 300 that belongs to the local network 500 via the firewall 600.

The data transmitted to the computer 300 is, for example, a communication failure log stored in the HDD 240, and is transmitted to the computer 300 in response to the connection from the computer 300.

Moreover, the two-way transmission protocol of the communication failure log among the image forming apparatuses 200A-200C is not limited in particular, and it is possible to use a go-it-alone protocol, or an existing protocol, for example, FTP (File Transfer Protocol), SMB (Server Message Block), LPR (Line Printer Remote), and RAW (TCP/IP).

Next, the computer 300 will be described below.

Figure 3:
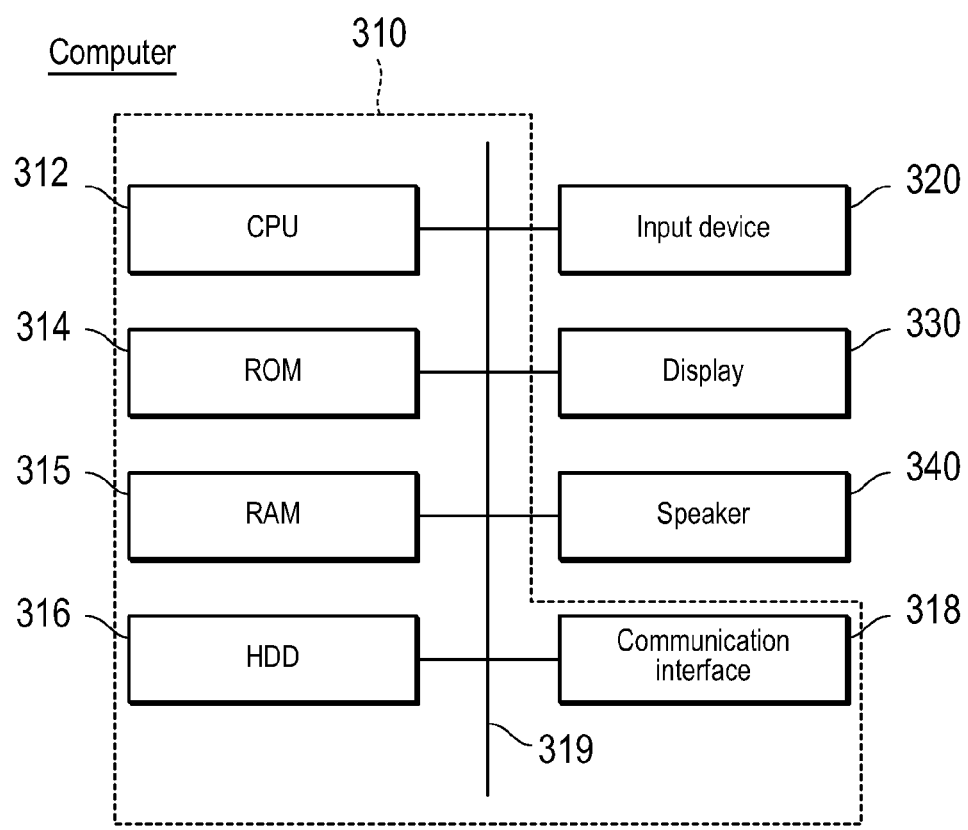
FIG. 3 is a block diagram for describing the computer shown in FIG. 1.

FIG. 3 is a block diagram for describing the computer shown in FIG. 1.

The computer 300 has a main unit 310, an input device 320, a display 330, and a speaker 340.

The main unit 310 has a CPU 312, a ROM 314, a RAM 315, an HDD 316, and a communication interface 318, all of which are interconnected via a bus 319.

The CPU 312 is a control circuit with microprocessors and the likes that control the aforementioned various parts and execute various arithmetic processes according to programs, and various functions of the computers 300 are realized as the CPU 312 executes the corresponding programs.

The ROM 314 is a non-volatile semiconductor memory for storing various programs and data. The RAM 315 is a volatile semiconductor memory for temporarily storing programs and data as a working area. The HDD 316 is a large capacity magnetic disk storage device for storing an OS (Operating System), application software, printer drivers, control programs, various other programs, and data.

The stored program is read out as it becomes necessary by the CPU 312 and is executed on the RAM 315.

The application software is a document preparation program used for preparing print data. The standards of print data include XPS (XML Paper Specification), PDF (Portable Document Format), TIFF (Tagged Image File Format), etc.

The printer driver is used for converting electronic document data into print data in a language format applicable to the image forming apparatus 200, and for transmitting it as a print job to the image forming apparatus 200. The language format is, for example, a PDL (Page Description Language) such as PostScript (registered trademark) and PCL (Printer Control Language).

The control program has a log receiving module, a communication failure log analysis module, a status information notification module, a warning display module, etc.

The log receiving module is used for receiving a communication failure log transmitted by the image forming apparatus 200 on the occasion when the image forming apparatus 200 responds to a requested connection. The communication log failure analysis module is used for extracting the identification data and status information contained in the communication failure log by means of analyzing the received communication failure log.

The status information notice module is used for transmitting to other computers 300 the status information contained in the communication failure log received. The status information notification module is setup in such a way as to transmit the status information only to the other computer 300 that corresponds with the identification data contained in the communication failure log, when its own identification data is different from the identification data contained in the communication failure log.

The warning display module is used for displaying on the display 330 a warning for prompting the user's attention when the identification data of the computer apparatus 300 matches with the identification data contained in the communication failure log.

It is possible to store a portion of the programs and data stored in the ROM 314 into the HDD 316, or store a portion of the programs and data stored in the HDD 316 into the ROM 314 as needed.

The communication interface 318 is a communication part composed of an extended device (LAN board) that adds the communication function to the computers 300 via the local network 500, and is used for executing the two-way transmission of data with other computers 300 that belong to the local network 500, or executing the two-way transmission of data with the image forming apparatus 200 that belong to the local network 400 across the firewall 600. The data transmitted to other computers 300 is, for example, the status information obtained by analyzing the communication failure log.

The input device 320 has a keyboard and a pointing device such as a mouse and is used by the user for executing, for example, various settings and various instructions (inputs).

The display 330 is, for example, a CRT (Cathode Ray Tube) display or LCD, and is used for displaying various kinds of information as well as warnings for prompting the user's attention using a GUI (Graphic User Interface) screen.

The speaker 340 is an audio output device for outputting various kinds of sounds including alarm sounds (buzzer sounds). The alarm sound is used. for example, as a warning for notifying the system's abnormality.

The operations of the image forming apparatus 200 is described below.

Figure 4:
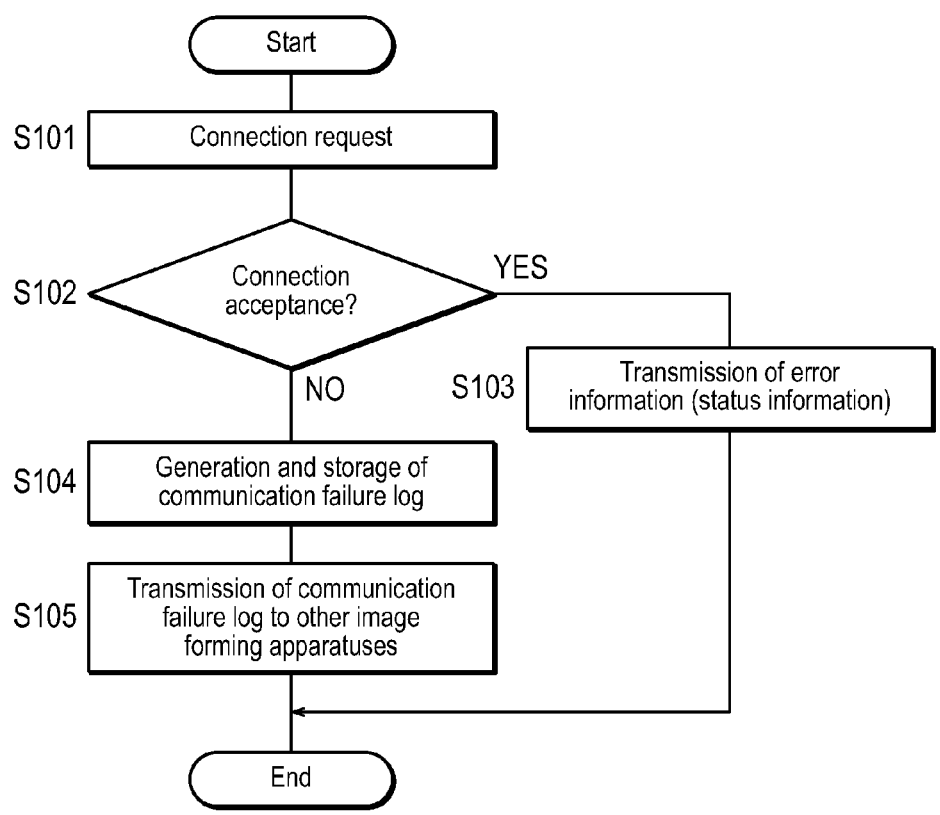
FIG. 4 is a flowchart for describing the operations of the image forming apparatus at a connection to the computer.

FIG. 4 is a flowchart for describing the operations of the image forming apparatus at a connection to the computer. The algorithm shown in the flowchart of FIG. 4 is stored as a control program in the HDD 240 and is executed by the CPU 210.

A case of a printing error generated during the execution of a print job requested by the computer 300 is described below as an example.

First, a connection to the computer 300, which previously ordered a print job, is requested in order to transmit the error information (status information) (step S101). If there is a response from the computer 300 and the connection is accepted (step S102: Yes), the error information is transmitted to the computer 300 (step S103), and the process ends. In other words, if there is no access restriction by the firewall 600, the error information notification is executed normally and the notification process is completed.

On the other hand, if there is no response from the computer 300, and it is judged that the connection was failed (the access is blocked by the firewall 600) (step S102: No), a communication failure log containing an error information (the status information that was intended to be transmitted) and the identification data of the computer 300 that failed in the connection are generated and stored into the HDD 240 (step S104).

The same communication failure log is transmitted to other image forming apparatuses 200 registered on the identification data table (step S105), and the process ends.

It is possible to delete the generated communication failure log, suitably. For example, it can be configured in such a manner to delete the communication failure log automatically after it is transmitted to other image forming apparatuses, or after another connection is made by the computer that failed in a connection, or after a predetermined time elapses, or after the memory capacity of communication failure logs reached a predetermined value.

Figure 5:
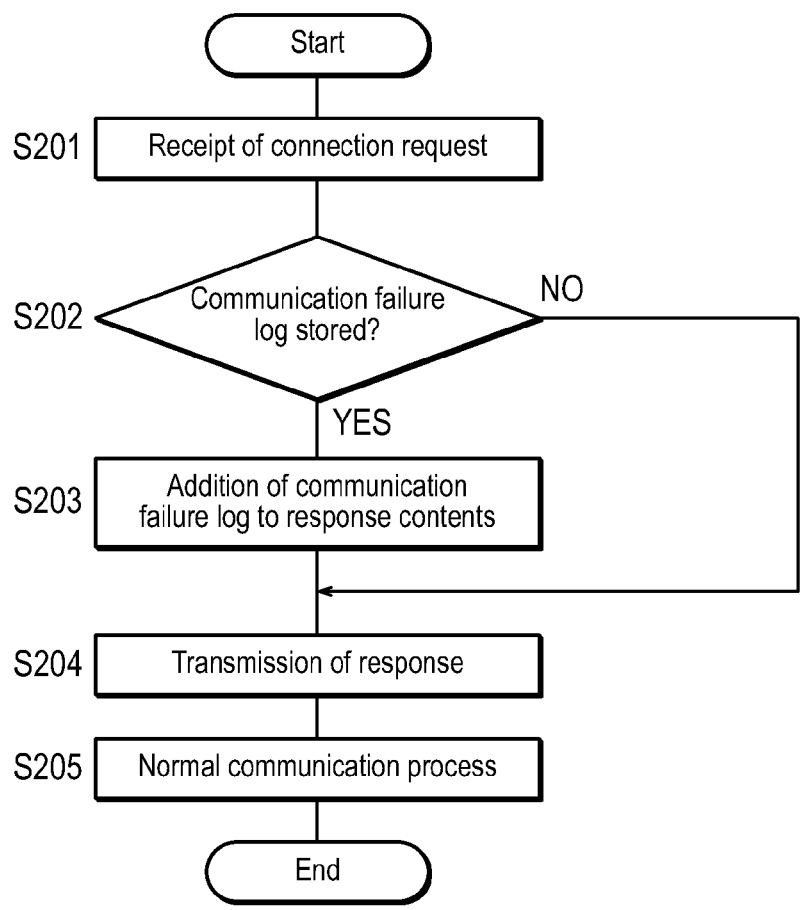
FIG. 5 is a flowchart for describing the operations of the image forming apparatus at a connection from the computer.

FIG. 5 is a flowchart for describing the operations of the image forming apparatus at a connection from the computer. The algorithm shown in the flowchart of FIG. 5 is stored as a control program in the HDD 240 and is executed by the CPU 210.

For example, upon receiving a connection request from the computer 300 asking for a new print job to be executed (step S201), a judgment is made as to whether or not a communication failure log is stored in the HDD 240 (step S202).

If it is judged that a communication failure log is stored in the HDD 240 (step S202: Yes), the communication failure log is added to the response content (step S203), and transmitted at the time of the response to the connection (step S204). If it is judged that a communication failure log is not stored in the HDD 240 (step S202: No), step S203 is skipped.

It is then followed by the normal communication process for receiving the print job (step S204).

The transmission of the communication failure log is not limited to the style of transmitting it by adding it to the response content, but also it is possible to add the data indicating the existence of the communication log, rather than the communication failure log itself. In such a case, the computer 300 requests a connection separately (requests a connection again) to acquire the communication failure log after the communication is completed.

It is possible to delete the stored communication failure log, suitably. For example, it can be configured in such a manner to delete the communication failure log automatically after it is transmitted to the computer that asked for a new print job to be executed, or after a predetermined time elapses, or after the memory capacity of communication failure logs reached a predetermined value.

Figure 6:
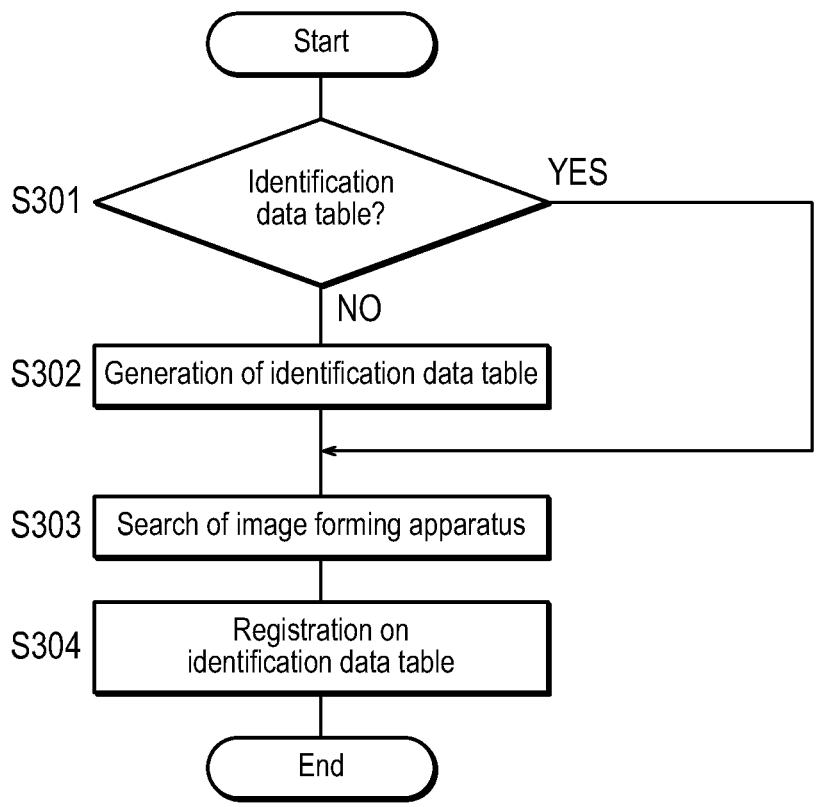
FIG. 6 is a flowchart to be used for describing the process of generating an identification data table related to step S105 shown in FIG. 4.

FIG. 6 is a flowchart to be used for describing the process of generating the identification data table related to step S105 shown in FIG. 4. The algorithm shown in the flowchart of FIG. 6 is stored as a control program in the HDD 328 and is executed by the CPU 312.

First, a judgment is made as to whether or not the identification data table for registering the image forming apparatus 200 to which the communication failure log is transmitted is stored in the HDD 328 (step S301). If it is judge that the identification data table does not exist (step S301: No), the identification data table is generated (step S302). If it is judge that the identification data table exists (step S301: Yes), the step S302 is skipped.

The image forming apparatus 200 connected to the local network 400 is then searched (step S303). For the search of the image forming apparatus 200, for example, Broadcast, Multicast, and Unicast can be used, The identification data of the searched image forming apparatus 200 is then registered on the identification data table (step S304).

It is possible to enter the identification data of the image forming apparatus 200 manually using the input device 320. Moreover, it is also possible to register to the identification data table, not every image forming apparatus 200 connected to the local network 400, but rather only the particular image forming apparatus 200 as needed.

The operations of the computer 300 is described below.

Figure 7:
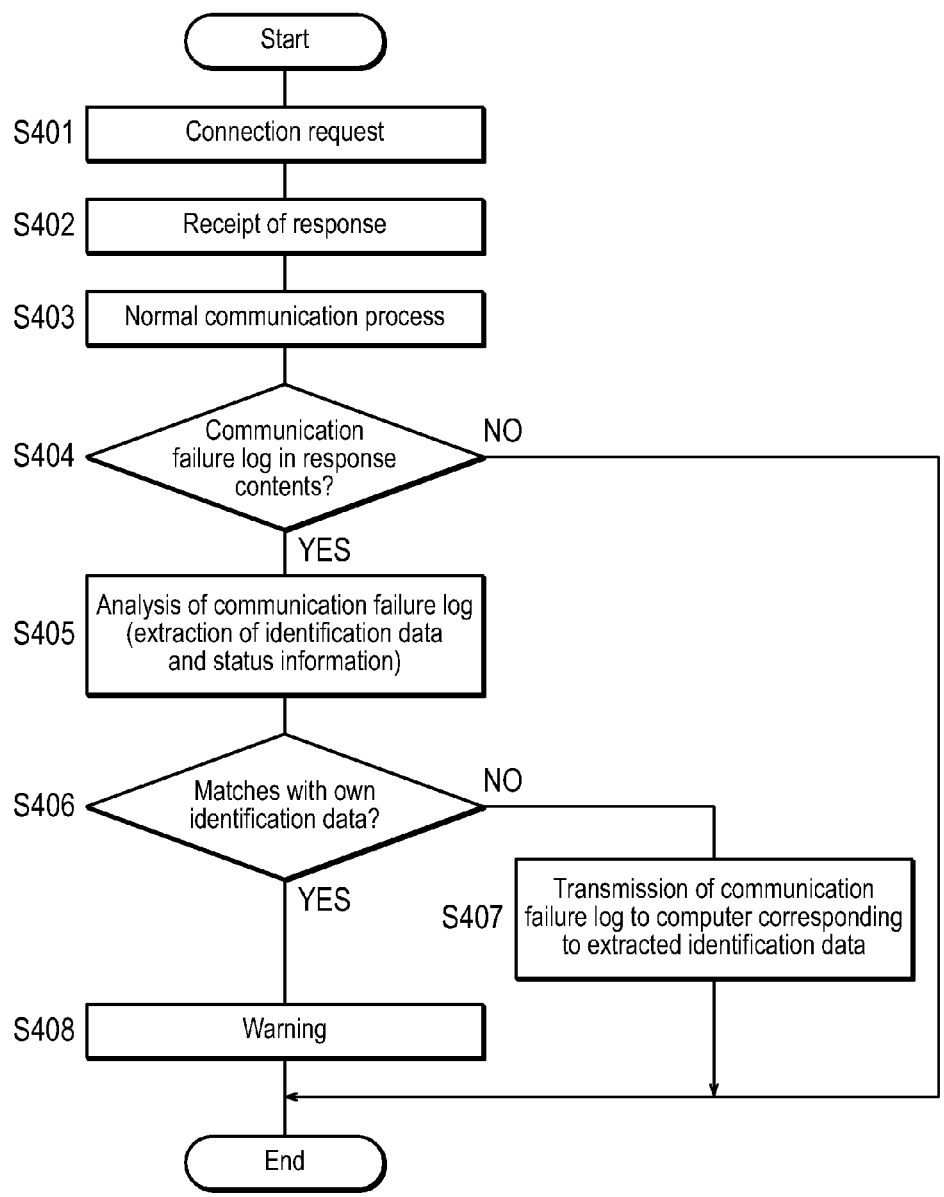
FIG. 7 is a flowchart for describing the operations of the computer at a connection to the image forming apparatus.

FIG. 7 is a flowchart for describing the operations of the computer at a connection to the image forming apparatus. The algorithm shown in the flowchart of FIG. 7 is stored as a control program in the HDD 328 and is executed by the CPU 312.

For example, a connection to the image forming apparatus 200 is requested asking it to execute a print job (step S401). As the contents of the response of the image forming apparatus 200 for the particular connection request are received (step S402), a normal communication process is executed to transmit the print job (step S403).

After the transmission completion of the print job, a judgment is made as to whether or not the content of the response includes a communication failure log (step S404). If it is judged that the response content does not include a communication failure log (step S404: No), the process ends.

If it is judged that the response content includes a communication failure log (step S404: Yes), the communication failure log is analyzed to extract the identification data and the status information contained in the communication failure log (step S405).

A judgment is then made as to whether or not the extracted identification data matches with its own identification data (identical or not) (step S406).

If it is judged that the extracted identification data is different from its own identification data (step S406: No), the communication failure log is transmitted to the computer 300 that corresponds with the extracted identification data (step S407) and the process ends.

If it is judged that the extracted identification data matches with its own identification data (step S406: Yes), a warning is indicated on the display 330 to prompt the user's attention (step S408), and the process ends.

As mentioned above, since a communication failure log is transmitted at the instance when the image forming apparatus 200 responds to a connection from the computer 300, which is connected to it via the local network 500, the particular communication is allowed even if the firewall 600 exists between them (regardless of the aforementioned configuration of the firewall 600). Moreover, since the computer 300 that received the communication failure log transmits the status information to other computers 300 connected to the local network 500, the status information can be securely transmitted to the destination computer 300 that failed the connection.

This is particularly advantageous for a mobile terminal such as a laptop computer whose location and network are often changed, as it guarantees secure receipt of the status information without modifying the configuration of the firewall even though the security environment is changed.

It is possible to delete the received communication failure log, suitably. For example, it can be configured in such a manner to delete the communication failure log automatically after it is read by the user who received a warning, or after it is transmitted to the computer corresponding to the extracted identification data, or after a predetermined time elapses, or after the memory capacity of communication failure logs reached a predetermined value.

The warning message in step S408 can be replaced with a warning voice from the speaker 340, or can be used in addition to a warning voice from the speaker 340.

If the content of the status information is, for example, error information of the image forming apparatus 200 and may affect the computers other than the destination computer 300, it is preferable to notify (warn) the other computers 300 with the content of the status information.

The normal communication process related to step S403 is not limited to the embodiment of executing it prior to the process (step S404) of making a judgment as to whether or not the response content includes the communication failure log.

Figure 8:
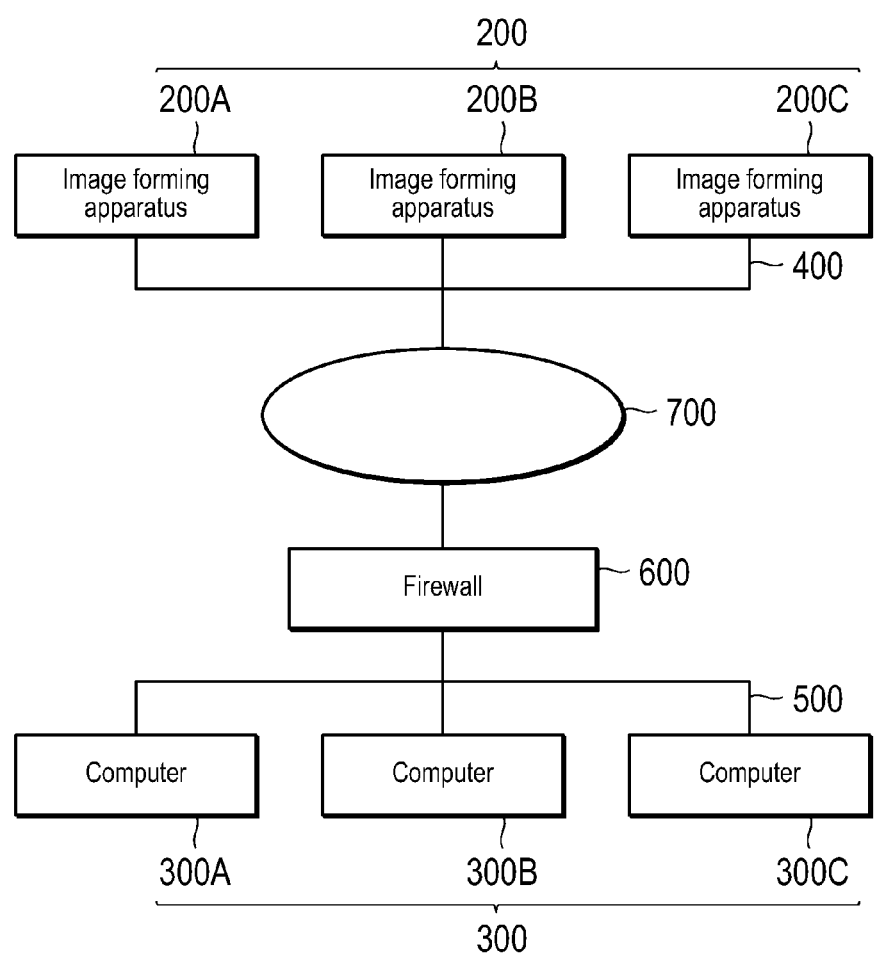
FIG. 8 is a conceptual diagram for describing a modification 1 according to the embodiment of the present invention.

FIG. 8 and FIG. 9 are conceptual diagrams for describing modifications 1 and 2 according to the embodiment of the present invention.

The local network 400 to which the image forming apparatus 200 is connected and the local network 500 to which the computer 300 is connected do not have to be directly connected across the firewall 600, but also can be connected via an external network 700 such as the Internet as shown in FIG. 8. Moreover, as shown in FIG. 9, it is possible to install a firewall 650 on the side of the local network 400 to which the image forming apparatus 200 is connected.

As can be seen from the above, by means of the image forming system, the image forming apparatus, the computer, and the computer readable recording medium stored with a control program according to the present embodiment, the communication failure log is transmitted at the time when the image forming apparatus responds to the particular connection from the computer connected to the second network, so that the communication is not denied even if an access control device, which allows a connection to the image forming apparatus from the computer and denies a connection to the computer from the image forming apparatus, intervenes between them (regardless of said configuration of the access control device). Moreover, since the computer that received the communication failure log transmits the status information (or the location designation data of the status information) to other computers connected to the second network, the status information can be securely transmitted to the computer to which the connection from the image forming apparatus failed. In other words, it is possible to notify the status information of the image forming apparatus to the computer to which the connection from the image forming apparatus failed.

It is obvious that this invention is not limited to the particular embodiments shown and described above but may be variously changed and modified without departing from the technical concept of this invention.

For example, the image forming apparatus 200 shall not be construed to be limited to a dedicated printer, but rather it can be an MFP (Multi-Function Peripheral) having copying, printing, and scanning functions. Also, the warning to be issued in order to prompt the user's attention when the identification data contained in the communication failure log is the same as the identification data of the computer does not be limited to the embodiment of warning indications on the display or warning sounds by the speaker, but light (flashing light by a lamp) is also available.

Also, the means, method, and program according to the present invention can be realized by a dedicated hardware circuit. Moreover, in case when the present invention is to be materialized using a program, the program can be provided in the form of a computer readable recording medium such as a USB (Universal Serial Bus) memory, a DVD (Digital Versatile Disc)-ROM (Read Only Memory), or provided on-line via a network such as the Internet without using a recording medium. In such a case, the program is typically transmitted to and stored in a storage device such as a hard disk. Also, the program can be either provided as independent application software or can be built into another piece of software as one of its functions.

What is claimed is:

1. An image forming system comprising:
a plurality of image forming apparatuses connected to a first network; and
a plurality of computers which are connected to a second network and transmit jobs to said image forming apparatuses, wherein
one of said plurality of image forming apparatuses has a log notification part that transmits a communication failure log in response to a connection initiated from one of said plurality of computers connected to the second network,
said communication failure log contains status information planned to be transmitted by the one or another one of said plurality of image forming apparatuses that is connected to the first network, to any of said plurality of computers connected to the second network, the any of said plurality of computers to which said one or another one of said plurality of image forming apparatuses failed in a connection, or location designation data for designating a location in the first network where said status information is stored, and
said one of said plurality of computers has a log receiving part for receiving said communication failure log transmitted from said one of said plurality of image forming apparatuses, and a status information notification part for transmitting said status information or said location designation data contained in the received communication failure log to another of said plurality of computers connected to the second network.

2. The image forming system as claimed in claim 1, wherein said communication failure log further containing identification data of at least one of said plurality of computers to which said connection failed.

3. The image forming system as claimed in claim 2, wherein said one of said plurality of image forming apparatuses further comprises a log sharing part that transmits the communication failure log that contains said status information or said location designation data to another of said plurality of image forming apparatuses that are connected to the first network, when said one of said plurality of image forming apparatuses fails in a connection to the one of said plurality of computers connected to the second network for the purpose of transmitting its own status information.

4. The image forming system as claimed in claim 2, wherein said status information notification part of said one of said plurality of computers transmits said status information or said location designation data to the one of said plurality of computers corresponding to said identification data contained in said communication failure log, when said one of said plurality of computers' identification data does not match with said identification data contained in said communication failure log.

5. The image forming system as claimed in claim 1, wherein said status information contains error information or job completion information of at least one of said plurality of image forming apparatuses that failed in the connection.

6. An image forming apparatus applied to an image forming system with a plurality of image forming apparatuses connected to a first network and a plurality of computers which are connected to a second network and transmit jobs to said image forming apparatuses, the image forming apparatus comprising:

a log notification part that transmits a communication failure log to one of said plurality of computers connected to the image forming apparatus in response to a connection initiated from that one of said plurality of computers, said communication failure log containing status information planned to be transmitted by the image forming apparatus or another one of the plurality of image forming apparatuses that is connected to the first network, to any of said plurality of computers connected to the second network, the any of said plurality of computers to which said image forming apparatus failed in a connection, or location designation data for designating a location in the first network where said status information is stored.

7. The image forming apparatus as claimed in claim 6, wherein said communication failure log further containing identification data of at least one of said plurality of computers to which said connection failed.

8. The image forming apparatus as claimed in claim 7 further comprising a log sharing part that transmits the communication failure log that contains said status information or said location designation data to another of the plurality of image forming apparatuses that are connected to the first network, when said image forming apparatus fails in a connection to the one of said plurality of computers connected to the second network for the purpose of transmitting its own status information.

9. The image forming apparatus as claimed in claim 8 further comprising a table where identification data of the image forming apparatus connected to the first network is registered, wherein said log sharing part transmits said communication failure log to said image forming apparatus registered in said table.

10. The image forming apparatus as claimed in claim 9 further comprising a search part for searching the image forming apparatus connected to the first network, and a registration part for registering the identification data of the searched image forming apparatus to said table.

11. The image forming apparatus as claimed in claim 6, wherein said status information contains error information or job completion information of at least one of said plurality of image forming apparatuses that failed in the connection.

12. A non-transitory computer readable recording medium stored with a control program for controlling an image forming apparatus applied to an image forming system with a plurality of image forming apparatuses connected to a first network and a plurality of computers which are connected to a second network and transmit jobs to said plurality of image forming apparatuses, wherein said control program causes said image forming apparatus to execute a process comprising a log notification procedure of transmitting a communication failure log to one of said plurality of computers connected to the image forming apparatus by means of a log notification part of the image forming apparatus in response to a connection initiated from that one of said plurality of computers,
said communication failure log contains status information planned to be transmitted by the image forming apparatus or another one of the plurality of image forming apparatuses that is connected to the first network, to any of said plurality of computers connected to the second network, the any of said plurality of computers to which said image forming apparatus failed in a connection, or location designation data for designating a location in the first network where said status information is stored.

13. The non-transitory computer readable recording medium claimed in claim 12, wherein said communication failure log further containing identification data of at least one of said plurality of computers to which said connection failed.

14. The non-transitory computer readable recording medium claimed in claim 13, wherein said process further comprises a log sharing procedure of transmitting the communication failure log that contains said status information or said location designation data to another of the plurality of image forming apparatuses that are connected to the first network by means of a log sharing part of said image forming apparatus, when said image forming apparatus fails in a connection to the one of said plurality of computers connected to the second network for the purpose of transmitting the status information of said image forming apparatus.

15. The non-transitory computer readable recording medium claimed in claim 14, wherein said image forming apparatus has a table where identification data of said image forming apparatus connected to the first network is registered, and said communication failure log is transmitted to said image forming apparatus registered in said table in said log sharing procedure.

16. The non-transitory computer readable recording medium claimed in claim 15, wherein said process further comprises a search procedure of searching the image forming apparatus connected to the first network by means of a search part of said image forming apparatus, and
a registration procedure of registering the identification data of the searched image forming apparatus to said table by means of a registration part of said image forming apparatus.

17. The non-transitory computer readable recording medium claimed in claim 12, wherein said status information contains error information or job completion information of at least one of said plurality of image forming apparatuses that failed in the connection.

18. A computer applied to an image forming system with a plurality of image forming apparatuses connected to a first network and a plurality of computers which are connected to a second network and transmit jobs to said image forming apparatuses, one of said plurality of computers comprising:
a log receiving part; and
a status information notification part, wherein
said log receiving part receives a communication failure log transmitted from one of said plurality of image forming apparatuses when said one of said plurality of image forming apparatuses connected to the first network responds to a connection requested,
said communication failure log containing status information planned to be transmitted by the one or another one of said plurality of image forming apparatuses that is connected to the first network, to any of said plurality of computers connected to the second network, the any of said plurality of computers to which said one or another one of said plurality of image forming apparatuses failed in a connection, or location designation data for designating a location in the first network where said status information is stored, and
said status information notification part transmits said status information or said location designation data contained in the received communication failure log to another of said plurality of computers connected to the second network.

19. The computer as claimed in claim 18, wherein said communication failure log further containing identification data of at least one of said plurality of computers to which said connection failed.

20. The computer as claimed in claim 19, wherein said status information notification part transmits said status information or said location designation data to the one of said plurality of computers corresponding to said identification data contained in said communication failure log when said identification data contained in said communication failure log does not match with its own identification data.

21. The computer as claimed in claim 19, further comprising a display device for displaying a warning for prompting user's attention when said identification data contained in said communication failure log matches with its own identification data.

22. The computer as claimed in claim 19, further comprising an audio output device for sounding a warning for prompting user's attention when said identification data contained in said communication failure log matches with its own identification data.

23. The computer as claimed in claim 18, wherein said status information contains error information or job completion information said at least one of said plurality of image forming apparatuses that failed in the connection.

* * * * *